(12) United States Patent
Sudani et al.

(10) Patent No.: US 6,715,509 B2
(45) Date of Patent: Apr. 6, 2004

(54) ELECTROMAGNETIC VALVE AND ASSEMBLING METHOD

(75) Inventors: Yuzuru Sudani, Hekinan (JP); Taku Itoh, Chita-gun (JP); Haruhiko Uno, Okazaki (JP)

(73) Assignee: Denso Corporation (JP)

(*) Notice: Subject to any disclaimer, the term of this patent is extended or adjusted under 35 U.S.C. 154(b) by 45 days.

(21) Appl. No.: 10/020,435

(22) Filed: Dec. 18, 2001

(65) Prior Publication Data
US 2002/0074046 A1 Jun. 20, 2002

(30) Foreign Application Priority Data

| Dec. 19, 2000 | (JP) | 2000-385287 |
|---|---|---|
| Mar. 22, 2001 | (JP) | 2001-082180 |
| Mar. 26, 2001 | (JP) | 2001-087736 |
| Oct. 31, 2001 | (JP) | 2001-334267 |

(51) Int. Cl.[7] ............................................. F15B 13/044
(52) U.S. Cl. ............................. 137/625.65; 137/625.27
(58) Field of Search ...................... 137/625.27, 625.65

(56) References Cited

U.S. PATENT DOCUMENTS

| 2,934,090 A | * | 4/1960 | Kenann et al. | 137/625.27 |
|---|---|---|---|---|
| 4,074,700 A | * | 2/1978 | Engle | 137/625.65 |
| 4,538,645 A | * | 9/1985 | Perach | 137/625.65 |
| 4,596,273 A | * | 6/1986 | Kiyoshima | 137/625.65 |
| 4,844,122 A | * | 7/1989 | Ichihashi | 137/625.65 |
| 4,979,542 A | * | 12/1990 | Mesenich | 137/625.65 |
| 5,092,365 A | * | 3/1992 | Neff | 137/625.65 |
| 5,218,999 A | * | 6/1993 | Tanimoto | 137/625.65 |
| 5,246,033 A | | 9/1993 | Brehm et al. | |

FOREIGN PATENT DOCUMENTS

JP    A-10-292879    11/1998

* cited by examiner

Primary Examiner—Gerald A. Michalsky
(74) Attorney, Agent, or Firm—Nixon & Vanderhye PC

(57) ABSTRACT

In an electromagnetic valve, a maximum distance between a movable core and a fixed core is set to be larger than a movable stroke of a movable rod moving together with the movable core. Therefore, a movable stroke of the movable core is set by a movable stroke of the movable rod, and the movable core always does not contact the fixed core. Accordingly, a vibration of the fixed core can be restricted and noise caused in the electromagnetic valve can be reduced. Further, because the movable core is movable without having an unnecessary moving stroke, a responsive performance of the electromagnetic valve relative to an electrical switching can be improved.

14 Claims, 8 Drawing Sheets

ELECTROMAGNETIC VALVE AND ASSEMBLING METHOD

CROSS-REFERENCE TO RELATED APPLICATIONS

This application is related to Japanese Patent Applications No. 2000-385287 filed on Dec. 19, 2000, No. 2001-82180 filed on Mar. 22, 2001, No. 2001-87736 filed on Mar. 26, 2001, and No. 2001-334267 filed on Oct. 31, 2001, the contents of which are hereby incorporated by reference.

BACKGROUND OF THE INVENTION

1. Field of the Invention

The present invention relates to an electromagnetic valve used for a liquid-pressure control valve with a duty-ratio control, and an assembling method for fixing and assembling a movable core of the electromagnetic valve.

2. Description of Related Art

Figure 9:
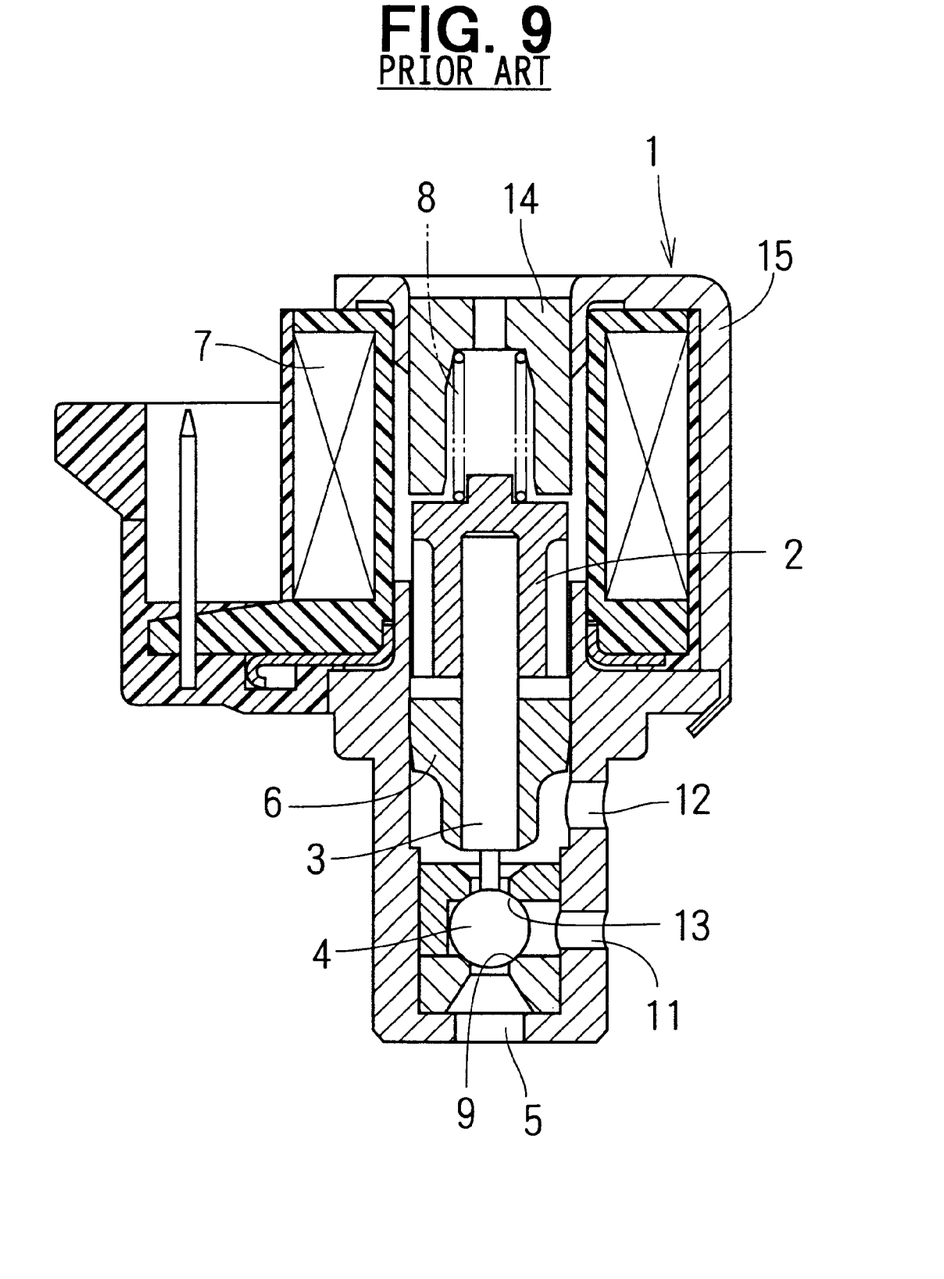
FIG. 9 is a cross-sectional view showing a conventional electromagnetic valve.

A conventional electromagnetic valve used for an oil-pressure control valve of an automatic changing gear is described in JP-A-10-292879. In the conventional electromagnetic valve 1, as shown in FIG. 9, a plunger 3 is supported in a shaft bearing 6 to be reciprocated with a movable core 2. An oil pressure of an operation oil flowing from an inlet port 5 is applied to a ball 4 toward the plunger 3 so that the ball 4 moves with the plunger 3. When electrical power is not supplied to a coil 7, the ball 4 seats on a valve seat 9 by spring force of a spring 8 for biasing the movable core 2, the plunger 3 and the ball 4 downwardly. Therefore, the ball 4 closes the inlet port 5, and an outlet port 11 communicates with a drain port 12. In this case, the oil pressure applied to a clutch or a brake decreases, and the clutch or the brake becomes a release state. On the other hand, when electrical power is supplied to the coil 7, the movable core 2 is moved toward a fixed core 14 against the spring force of the spring 8, and the ball 4 separates from the valve seat 9 and contact a valve seat 13. In this case, the high-pressure operation oil is supplied to the clutch or the brake, and the clutch or the brake becomes an engagement state.

However, in the conventional valve, the ball 4 is separated from the movable core 2 integrally fastened to the plunger 3, and the movable core 2 contacts the fixed core 14 by the electromagnetic attraction. Therefore, in duty-ratio control operation, vibration is transmitted from the fixed core 14 to a yoke 15, and relatively larger noise may be caused.

In addition, in order to accurately shut the communication between the outlet port 11 and the drain port 12 by using the ball 4, the stroke of the movable core 2 is set larger than that of the ball 4 by a predetermined distance, so that the ball 4 is sufficiently separated from the plunger 3. Thus, high-speed switching of the electromagnetic valve 1 is deteriorated by an unnecessary stroke required in the movable core 2, and a dynamic range with a linearity control in the relationship between a duty ratio and an output pressure becomes narrower. Further, in this case, the structure of a housing of the electromagnetic valve 1 becomes complex, and an assembling method thereof becomes difficult.

SUMMARY OF THE INVENTION

In view of the foregoing problems, it is an object of the present invention to provide an electromagnetic valve which prevents an inclination attachment and reduces noise.

It is an another object of the present invention to provide an electromagnetic valve having a wider dynamic range.

It is a further another object of the present invention to provide an electromagnetic valve which improves responsive performance relative to current switching operation.

It is a further another object of the present invention to provide an electromagnetic valve which reduces component number with a simple structure.

It is a further another object of the present invention to provide an assembling method of an electromagnetic valve, which can accurately attach a movable core to a shaft by simple operation.

According to a first aspect of the present invention, in an electromagnetic valve, a movable core is disposed in a housing opposite to a fixed core to be reciprocated in the housing, and a movable member is disposed to be reciprocated together with the movable core. The movable member includes a valve body for switching a communication between an inlet port and an outlet port and a communication between the outlet port and a drain port, and a shaft connected to both the movable core and the valve body. In addition, a coil for generating a magnetic attraction force for moving the movable core toward the fixed core is disposed, the shaft disposed to extend in an axial line has a radial dimension smaller than that of the valve body, the inlet port and the outlet port are provided in the housing in such a manner that the fluid flows into the housing from the inlet port in a direction along the axial line and flows out from the outlet port in a direction substantially perpendicular to the axial line, the fixed core and the movable core are disposed to have a maximum distance therebetween, the maximum distance is larger than a movable stroke of the movable member, and the movable core has a movable stroke that is controlled by the movable stroke of the movable member. Accordingly, in a case where the electromagnetic clutch is attached in a direction along the axial line, even when the fluid pressure of the outlet port is changed, the variation of the fluid pressure in the outlet port is applied in a direction perpendicular to the axial line, but is not applied to in a direction removing the electromagnetic valve. Thus, an inclination of the electromagnetic valve is prevented, and a frictional wear of a member for attaching the electromagnetic valve can be restricted. As a result, it is unnecessary to strengthen the attachment structure of the electromagnetic valve.

Because the movable stroke of the movable core is controlled by the movable stroke of the valve body, the movable core always does not contact the fixed core. Therefore, a generation of vibration of the fixed core can be prevented, and noise generated in the electromagnetic valve can be reduced. In addition, because the movable core does not contact the fixed core, a high-speed switching of the electromagnetic valve can be improved without providing an additional non-magnetic space between the movable core and the fixed core.

The housing has a first seat portion and a second seat portion opposite to the first seat portion. When the valve body contacts the first seat portion, the inlet port communicates with the outlet port, and a communication between the outlet port and the drain port is shut. On the other hand, when the valve body contacts the second seat portion, a communication between the inlet port and the outlet port is shut, and the outlet port communicates with the drain port. In addition, the shaft has a slidable portion slidable on an inner wall of the housing, and a small radial portion connected to the slidable portion and the valve body, and the drain port is provided in the housing around the small radial portion. Accordingly, component number of the electromagnetic valve can be reduced while the electromagnetic valve has a simple structure. As a result, the electromagnetic valve can be readily assembled using first and second assembling jigs. The first assembling jig includes a first position determination portion having a valve-body receiving chamber and a seat contact surface, and a second position determination portion having a standard end surface. In addition, the second position determination portion extends from a base position of the first position determination position to enclose the first position determination portion. Therefore, the assembling method of the electromagnetic valve can be made simple.

According to an another aspect of the present invention, in an electromagnetic valve, a maximum distance between a movable core and a housing is set larger than a movable stroke of a movable member, and a movable stroke of the movable core is controlled by the movable stroke of the movable member. Therefore, the movable core always does not contact the housing. Thus, generation of the vibration of the housing can be prevented, noise generated in the electromagnetic valve can be reduced. Accordingly, the electromagnetic valve is readily accurately assembled using an assembling jig.

BRIEF DESCRIPTION OF THE DRAWINGS

Additional objects and advantages of the present invention will be more readily apparent from the following detailed description of preferred embodiment when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
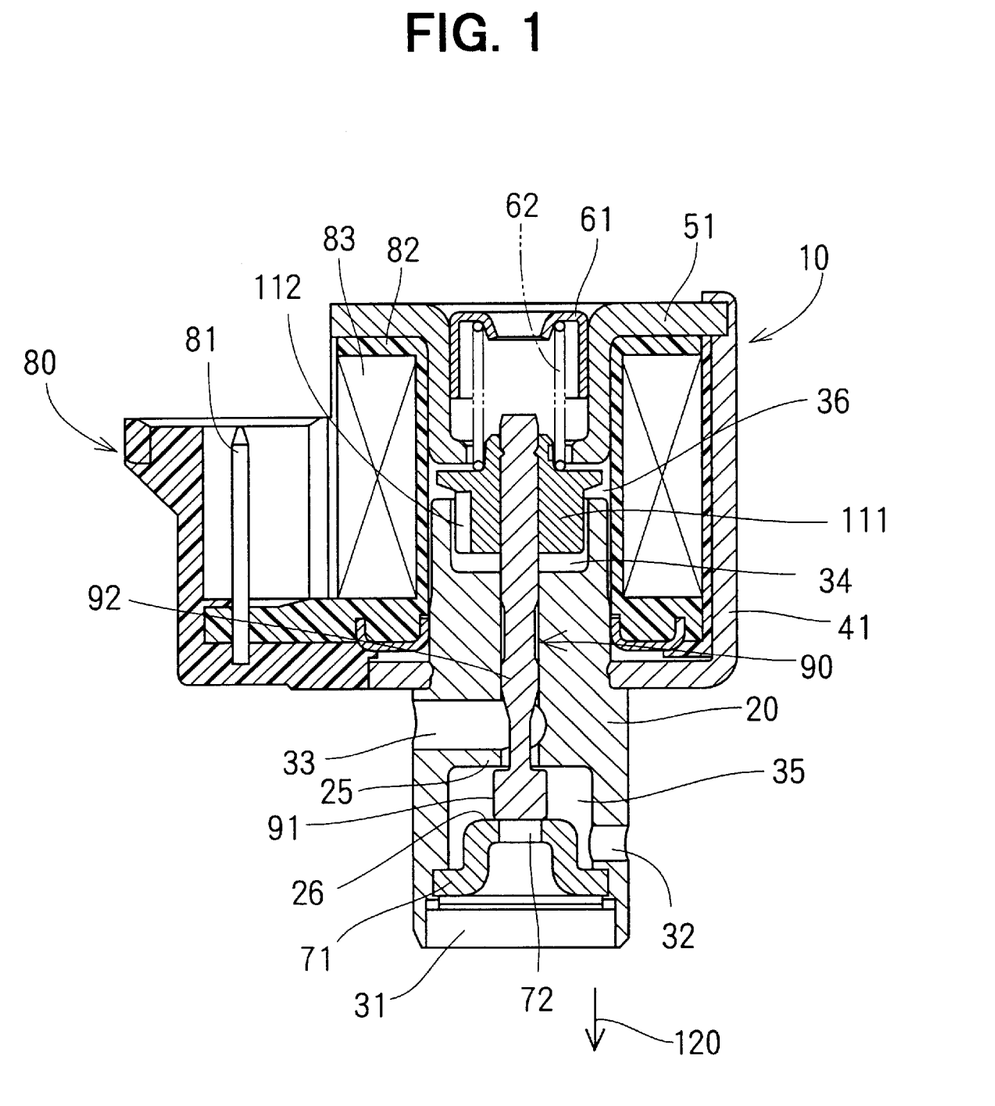
FIG. 1 is a cross-sectional view showing an electromagnetic valve according to a first preferred embodiment of the present invention.

A first preferred embodiment of the present invention will be now described with reference to FIGS. 1–5. An electromagnetic valve 10 shown in FIG. 1 is an electromagnetic three-way valve for controlling an oil pressure of an operation oil to be supplied to a brake or a clutch used as an engagement unit of an automatic gear. For example, the electromagnetic valve 10 is attached to a body member used as a fluid member for defining an oil pressure circuit, in an attachment direction 120 (lower direction in FIG. 1) shown in FIG. 1.

The electromagnetic valve 10 includes a housing 20, a yoke 41, a fixed core 51 and a movable core 111 which are made of a magnetic material such as iron. The housing 20, the yoke 41, the fixed core 51 and the movable core 111 construct a magnetic circuit of the electromagnetic valve 10. The fixed core 51 is fastened to the yoke 41, and the housing 20 is fixed to the yoke 41 by press-fitting or fastening.

Figure 2:
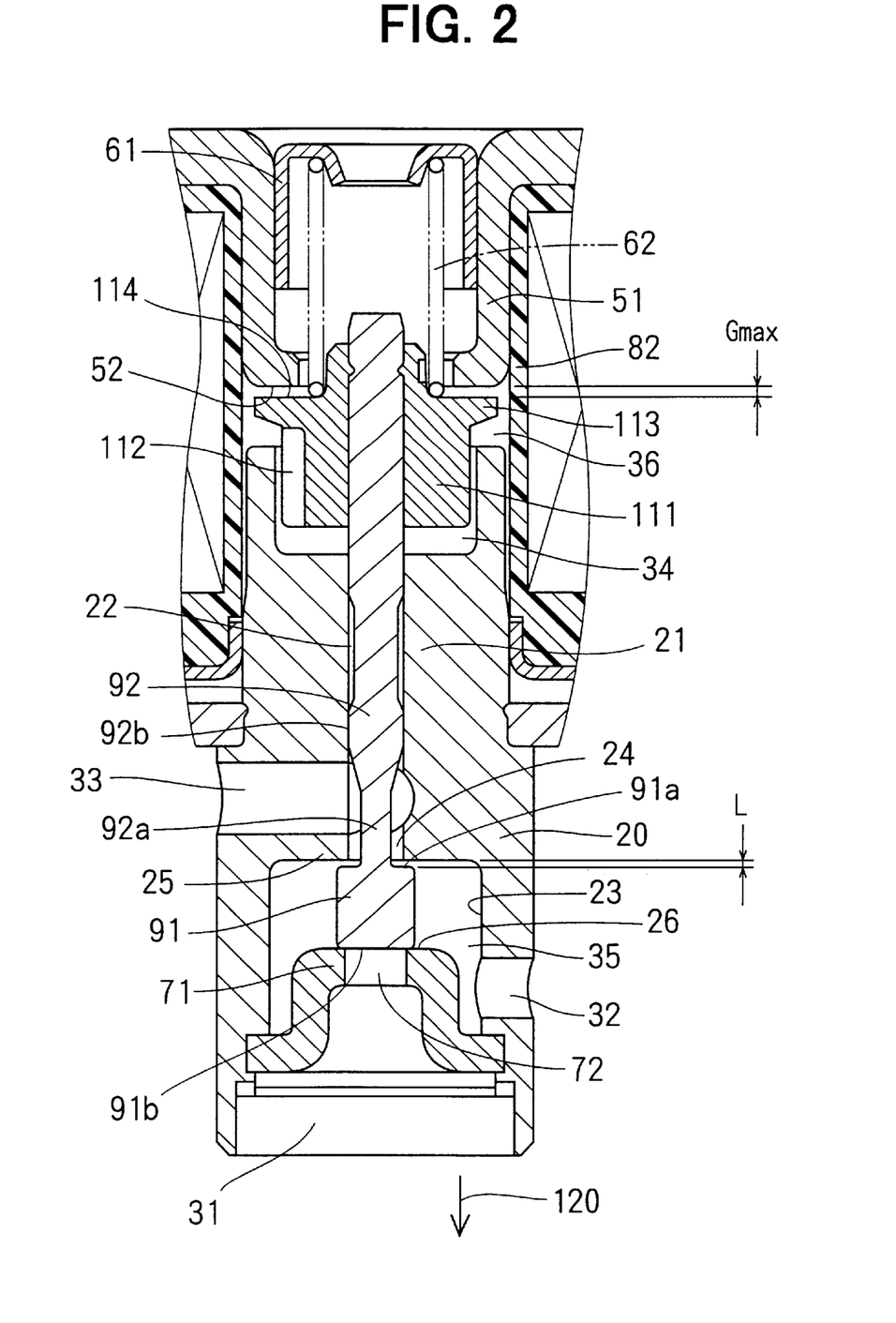
FIG. 2 is an enlarged view showing a main part of the electromagnetic valve shown in FIG. 1.

As shown in FIG. 2, the housing 20 has a shaft holding portion 21 that defines a receiving hole 22 for receiving a shaft 92 of a movable rod 90 used as a movable member described later. A recess portion 23 is provided in the housing 20 at a side of an inlet 31 of the shaft holding portion 21 to define an output pressure chamber 35 with a valve plate 71. A receiving chamber 34 for receiving the movable core 111 is provided in the housing 20 at an upper side position in FIG. 2, so that magnetic flux flows to a cylinder side surface of the movable core 111. A valve seat 25 (first seat portion) is provided in the housing on the bottom portion of the recess portion 23.

The valve plate 71 is fixed to the recess portion 23 so that the output pressure chamber 35 is formed by the valve plate 71 and the recess portion 23. A communication hole 72, through which the output pressure chamber 35 and the inlet port 31 communicate with each other, is provided in the valve plate 71. A valve seat 26 (second seat portion) is provided in the valve plate 71 to be opposite to the valve seat 25.

The inlet port 31, an outlet port 32 and a drain port 33 are provided in the housing 20. The inlet port 31 is connected to an oil-pressure supply source, and the outlet port 32 is connected to the clutch of the automatic gear or the brake through an oil passage. The drain port 33 is opened toward a low-pressure drain side, and is set at a position proximate to a shaft neck portion 92a which has a smaller radial dimension in the shaft 92. A rear surface 91a (upper surface in FIG. 2) of the valve body 91 is disposed to be seated on the valve seat 25. When the rear surface 91a of the valve body 91 seats on the valve seat 25, the inlet port 31 communicates with the outlet port 32. In this case, the operation oil flows into the housing 20 from the inlet port 31 in a direction opposite to the attachment direction 120 of the electromagnetic valve 10, and flows out from the outlet port 32 in a direction substantially perpendicular to an imagination axial line 120 along the attachment direction 120 of the electromagnetic valve 10. Here, an axial line of the shaft 92 of the movable rod 90 corresponds to a line along the attachment direction 120 of the electromagnetic valve 10. On the other hand, when a front surface 91b of the valve body 91 seats on the valve seat 26, the outlet port 32 communicates with the drain port 33. In this case, the operation oil flows from the outlet port 32 in a direction substantially perpendicular to the imagination axial line, and flows out from the drain port 33 in a direction substantially perpendicular to the imagination axial line.

The movable core 111 is held in an inner wall defining the receiving chamber 34 to be reciprocated in the receiving chamber 34, and is biased by a spring force of a return spring 62. The spring force of the return spring 62 can be adjusted by an adjustor 61 press-fitted into the inner wall of the fixed core 51. A flange portion 113 having a radial dimension approximately equal to the fixed core 51 is formed in the movable core 111 opposite to the fixed core 51. Gap passages 112 each of which extends from the flange portion 113 to a side opposite to the fixed core 51 are provided in an outer peripheral wall of the movable core 111 at three positions, for example, at 120 degrees interval. Therefore, an opposite surface area of the movable core 111, opposite to the fixed core 51 is not reduced due to the gap passages 112. A space 36 is formed between the outer peripheral wall of the movable core 111 and an inner peripheral wall of a bobbin 82, so that the gap passages 112 communicates with the receiving chamber 34 and the space 36. A maximum gap Gmax (i.e., maximum distance) is set between a magnetic attraction surface of the flange portion 113 of the movable core 111 at a side of the fixed core 51 and a magnetic attraction surface 52 of the fixed core 51 at a side of the movable core 111.

The movable rod 90 is an integrated member, and is constructed by a shaft 92 and a valve body 91 integrally connected to each other. The shaft 92 includes the shaft neck portion 92a connected to the valve body 91, and a shaft body portion 92b having a radial dimension larger than that of the shaft neck portion 92 and smaller than that of the valve body 91. The shaft neck portion 92a of the shaft 92 is positioned around the drain port 33 to face the drain port 33. The shaft body portion 92b is held in the inner wall of the shaft holding portion 21, defining the receiving hole 22, to be reciprocated in an axial direction (axial line) of the shaft holding portion 21. The valve body 91 is disposed to be selectively seated on the valve seat 25 and the valve seat 26, and a movable stroke (movable stroke limit) of the movable rod 90 in the axial direction is set at a dimension L, as shown in FIG. 2. Because the movable core 111 is integrally fastened to the movable rod 90, the movable stroke of the movable core 111 is also the dimension L. Here, the dimension L is set to be slightly smaller than the dimension Gmax, for example, by about 0.1 mm. Therefore, the magnetic attraction surface 114 of the movable core 111 always does not contact the magnetic attraction surface 52 of the fixed core 51.

A coil 83 wound on the bobbin 82 is disposed to enclose outer peripheries of the fixed core 51 and the movable core 111. Electrical voltage duty-ratio controlled is supplied to the coil 83 from a pin 81 of a connector 80.

Figure 3:
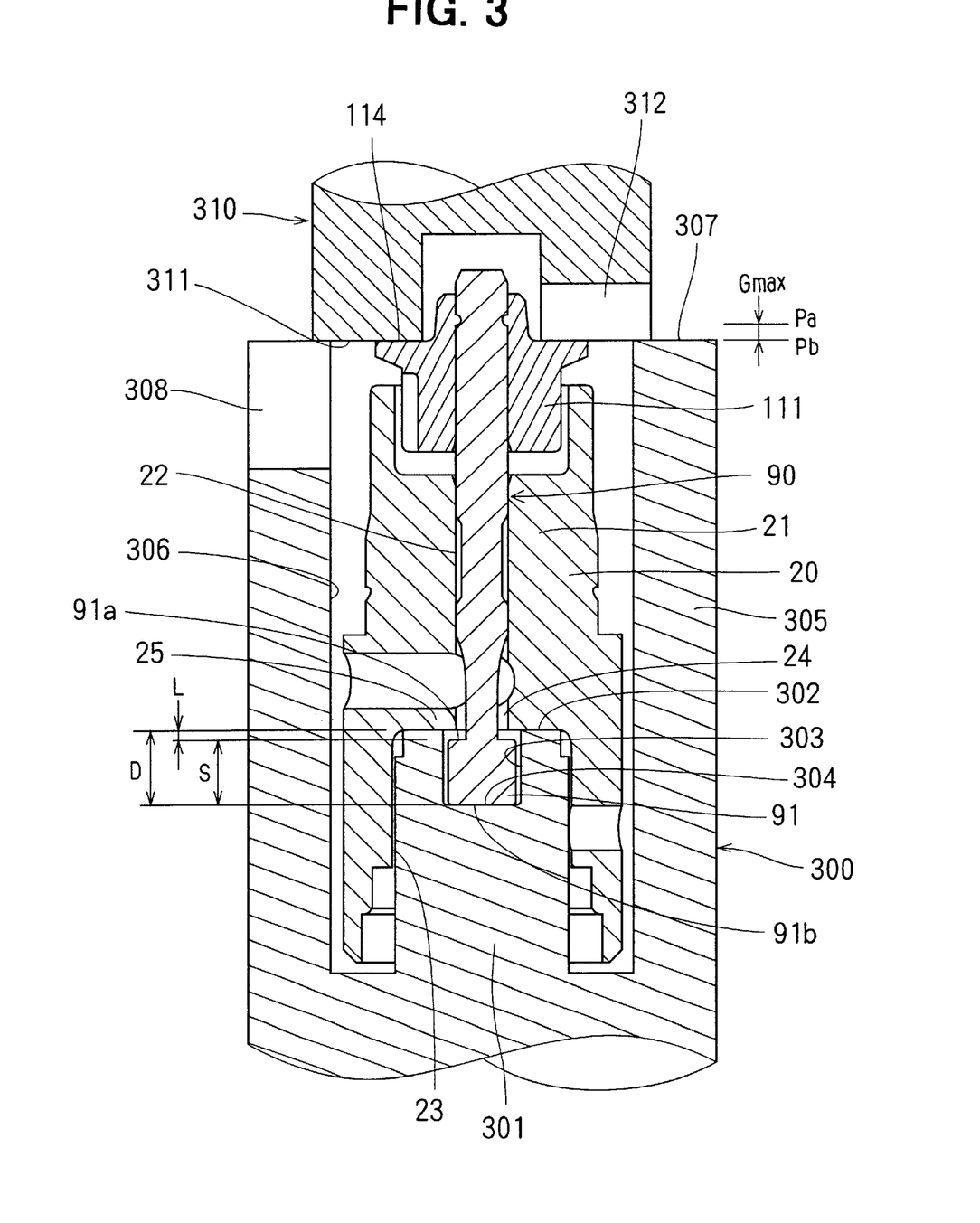
FIG. 3 is a cross-sectional view showing an assembling state of a movable core and a movable rod of the electromagnetic valve, according to the first embodiment.

Next, an assembling method of the movable core 111 to the movable rod 90 in the electromagnetic valve 10 will be now described with reference to FIG. 3. In the assembling method of FIG. 3, a first assembling jig 300 and a second assembling jig 310 are used. The first assembling jig 300 has a first position determination portion 301 provided to be inserted into the recess portion 23, and a second position determination portion 305 extending from a base portion of the first position determination portion 301 to enclose the first position determination portion 301.

The first position determination portion 301 has a receiving chamber 303 for receiving the valve body 91, and a seat contact surface 302 which can contact the valve seat 25. The depth D of the receiving chamber 303 of the first assembling jig 300 is set at an addition valve (S+L) adding the length dimension S of the valve body 91 and the stroke limit L of the movable core 111 in the axial direction.

The second position determination portion 305 has a recess portion 306 for receiving the housing 20, and a standard end surface 307. When the first assembling jig 300 is set, the standard end surface 307 is positioned at an axial position Pb separated from an axial position Pa of the magnetic attraction surface 52 of the fixed core 51 by the maximum gap Gmax provided between the magnetic attraction surface 114 of the movable core 111 and the magnetic attraction surface 52 of the fixed core 51. In addition, the second assembling jig 310 has a contact surface 311 which can contact the standard end surface 307 and the magnetic attraction surface 114 of the movable core 111.

In the assembling method of the first embodiment, first, the shaft 92 is inserted into the receiving hole 22. Then, the seat contact surface 302 of the first assembling jig 300 contacts the valve seat 25, and the movable core 111 is attached to the shaft 92 by inserting the shaft 92 into the movable core 111. In addition, the contact surface 311 of the second assembling jig 310 contacts the standard end surface 307 of the first assembling jig 300, the valve body 91 contacts a bottom surface 304 for defining the receiving chamber 303 of the first assembling jig 300, and the magnetic attraction surface 114 contacts the contact surface 311. In this state, the movable core 111 is fastened to the shaft 92 to be fixed and assembled to the shaft 92. Here, the position determination operation of the movable rod 90 and the variable core 111, and the fastening operation of the movable core 111 can be performed through recessed windows 308, 312 formed in the first assembling jig 300 and the second assembling jig 310. Finally, the first assembling jig 300 and the second assembling jig 310 are removed.

That is, the electromagnetic valve 10 assembled by the above-described method includes, the movable rod 90, the movable core 111 fixed to the shaft 92, the housing 20, the valve plate 71, the fixed core 51 and the return spring 62. The movable rod 90 is constructed by the shaft 92 and the valve body 91 at an axial end of the shaft 92. The movable core 111 is disposed to be fixed to the shaft 92, and has the magnetic attraction surface 114 that can be formed perpendicular to the axial line or can be formed into a conical shape.

The housing 20 with the shaft holding portion 21 has the receiving hole 22 in which the shaft 92 is held to be slidable in the axial direction, the drain port 33 communicating with the receiving hole 22 in a direction substantially perpendicular to the axial line, the drain communication hole 24 communicating with the receiving hole 22 in the axial direction, the valve seat 25 for opening and closing the drain communication hole 24 by using the rear surface 91a of the valve body 91, the recess portion 23 having the bottom wall used as the valve seat 25, the inlet port 31 defined by the top end portion of the recess portion 23, and the outlet port 32 provided in the side wall of the recess portion 23.

The valve plate 71 for defining the output pressure chamber 35 with the recess portion 23 is inserted and fixed from the inlet port 31, and has the communication hole 72 that is opened and closed by the front surface 91b of the valve body 91. The fixed core 51 has the magnetic attraction surface 52 opposite to the magnetic attraction surface 114 of the movable core 111. In addition, the return spring 62 is disposed to apply the spring force to the movable core 111 in a direction away from the magnetic attraction surface 52. When the electrical power supplied to the coil 83 is turned off, the valve body 91 separates from the valve seat 25, and contacts the valve seat 26, so that the communication hole 72 is closed and the communication hole 24 is opened. On the other hand, when the electrical power supplied to the coil 83 is turned on, the valve body 91 moves to be separated from the valve seat 26 and to contact the valve seat 25. Therefore, the communication hole 72 is opened, and the drain port 24 is closed. In addition, the magnetic attraction surface 114 of the movable core 111 and the magnetic attraction surface 52 of the fixed core 51 are set to not contact even when the electrical power is supplied to the coil 83.

In addition, in the assembling method of the shaft 92 and the movable core 111, the first assembling jig 300 having the first position determination portion 301 and the second position determination portion 305, and the second assembling jig 310 are used. Further, the first position determination portion 301 can be inserted into the recess portion 23, and has the receiving chamber 303 for receiving the valve body 91 and the seat contact surface 302. The seat contact surface 302 is disposed to contact the valve seat 25. The receiving chamber 303 is set to have the depth D that is the addition value adding the length dimension S of the valve body 91 and the stroke limit L of the valve body 91.

The second position determining portion 305 extends from the base portion of the first position determination portion 301 to enclose the first position determination portion 301. The second position determining portion 305 has the recess portion 306 in which the housing 20 can be received, and the standard end surface 307 that is positioned at the axial position Pb separated to the side of the movable core 111 from the axial position Pa of the magnetic attraction surface 52 of the fixed core 51 only by the maximum gap Gmax.

According to the assembling method of the first embodiment of the present invention, after the shaft 92 is inserted into the receiving hole 22, the seat contact surface 302 of the first assembling jig 300 contacts the valve seat 25, and the movable core 111 is fitted to the shaft 92. Further, the contact surface 311 of the second assembling jig 310 contacts the standard end surface of the first assembling jig 300, the valve body 91 contacts the bottom surface 304 defining the receiving chamber 303, and the magnetic attraction surface 114 contacts the contact surface 311. In this state, the movable core 111 is fastened to the shaft 92 to be fixed thereto. Accordingly, in this assembling method of the first embodiment, the movable core 111 can be readily accurately assembled to the shaft 92 of the movable rod 90 by simple operation.

Next, operation of the electromagnetic valve 10 will be now described.

When the electrical power supplied to the coil 83 is turned off, the front surface 91b (i.e., lower surface in FIG. 2) of the valve body 91 seats on the valve seat 26 by the spring force of the return spring 62 that biases the movable core 111 and the movable rod 90 downwardly in FIG. 2. Therefore, the valve body 91 seated on the valve seat 26 closes the inlet port 31 so that the outlet port 32 communicates with the drain port 33. When the outlet port 32 communicates with the drain port 33, the operation oil supplied to the clutch of the automatic gear or the brake discharges from the drain port 33, and oil pressure applied to the clutch or the brake is reduced. Accordingly, an engagement state of the clutch or the brake is released. At this time, the maximum gap Gmax is set between the magnetic attraction surface 114 of the flange portion 113 of the movable core 111 and the magnetic attraction surface 52 of the fixed core 51.

On the other hand, when the electrical power supplied to the coil 83 is turned on, the movable core 111 moves toward the fixed core 51 against the spring force of the return spring 62. When the movable rod 90 moves toward the fixed core 51 together with the movable core 111, the front surface 91b of the valve body 91 separates from the valve seat 26, and the rear surface 91a of the valve body 91 seats on the valve seat 25. Therefore, the communication between the outlet port 32 and the drain port 33 is shut, and the inlet port 31 communicates with the outlet port 32. When the inlet port 31 communicates with the outlet port 32, because high-pressure operation oil is supplied to the clutch or the brake from the outlet port 32, the clutch or the brake becomes in an engagement state. In the first embodiment, because the dimension L shown in FIG. 2 is set smaller than the maximum gap Gmax, the movable core 111 does not contact the fixed core 51 even when electrical power is supplied to the coil 83.

In the first embodiment, the duty ratio of the electrical voltage supplied to the coil 83 is controlled in a control unit (not shown), so that the oil pressure applied to the clutch or the brake connected to the outlet port 32 is adjusted, and the engaging state of the clutch or the brake is controlled.

The electrical voltage supplied to the coil 83 is repetitively turned on or off by a frequency (e.g., 60 Hz), and the movable core 111 reciprocates by this frequency in accordance the duty ratio. With the reciprocation movement of the movable core 111, oil flows into the receiving chamber 34 and the space 36 through the gap passages 112 provided on the outer peripheral wall of the movable core 111. Therefore, the movable core 111 continuously smoothly moves by using the supplied oil. In addition, because the operation oil flows through the gap passages 112 even in a low temperature on which the viscosity of the operation oil increase, a sufficient responsive performance of the movable core 111 in accordance with the duty ratio can be maintained.

Figure 4A:
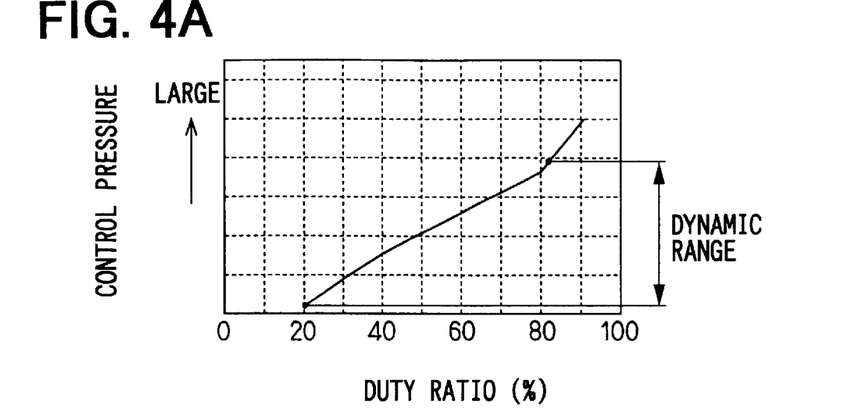
FIG. 4A is a graph showing a relationship between a duty ratio and an output pressure (control pressure) in an electromagnetic valve of a comparison example.
Figure 4B:
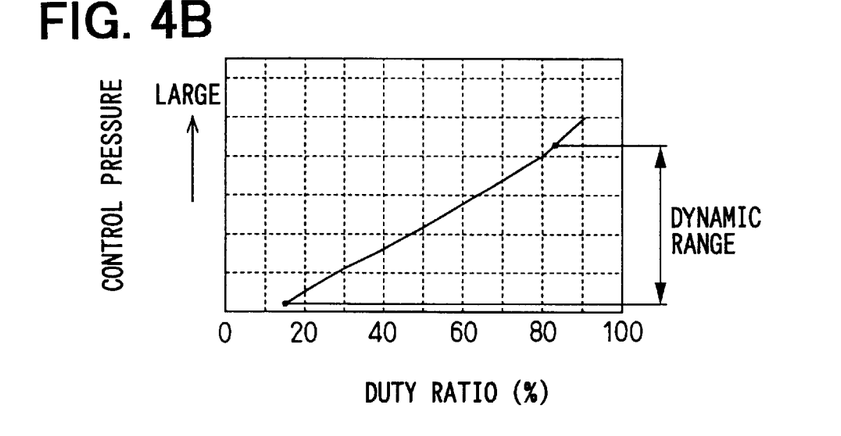
FIG. 4B is a graph showing a relationship between the duty ratio and the output pressure (control pressure) in the electromagnetic valve of the first embodiment.

FIG. 4A shows the relationship between the duty ratio and a solenoid control pressure of a comparison electromagnetic valve, and FIG. 4B shows the relationship between the duty ratio and the solenoid control pressure of the electromagnetic valve 10. In the comparison electromagnetic valve, the stroke of the movable core 111 is set larger than the stroke of the valve body 91. Therefore, in this case, a change of the electromagnetic valve cannot be performed rapidly due to the unnecessary stroke required in the movable core 2, and a dynamic range in the relationship between the duty ratio and the solenoid control pressure becomes narrow. Thus, it is difficult to control the engagement state of the clutch or the brake.

However, in the first embodiment of the present invention, because the shaft 92 and the valve body 91 of the movable rod 90 are constructed by an integrated member in the electromagnetic valve 10, an unnecessary moving stroke of the movable core 111 is not caused. Therefore, high-speed on/off operation of the electromagnetic valve 10 can be obtained, and the dynamic range in the relationship between the duty ratio and the solenoid control pressure becomes wider as shown in FIG. 4B. Thus, the control of the engagement state of the clutch or the brake can be readily performed.

Figure 5:
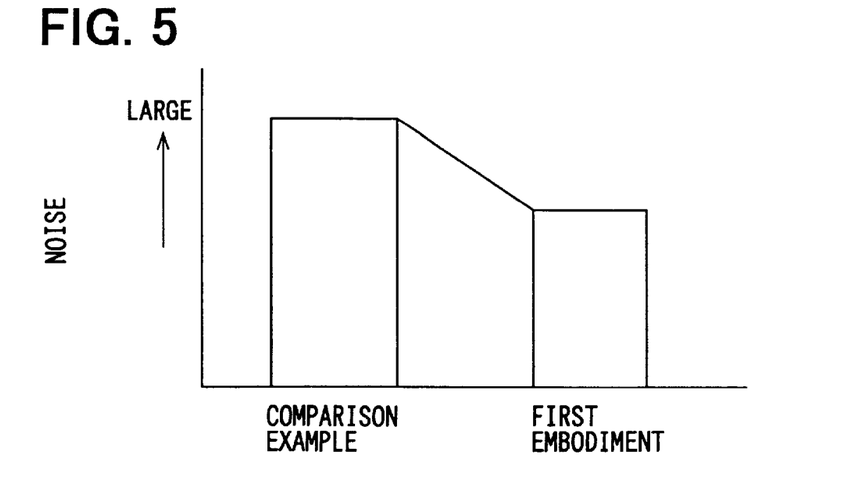
FIG. 5 is a view for explaining a noise-reducing effect of the electromagnetic valve in the first embodiment.

FIG. 5 shows measured noise in the electromagnetic valve 10 of the present invention, and in the electromagnetic valve of the comparison example. Here, the comparison example is the electromagnetic valve 1 shown in FIG. 9. In the comparison example, because the boll 4 (valve body) is separated from the movable core 2 integrally fastened to the plunger 3, the movable core 2 contacts the fixed core 14 by the electromagnetic attraction. In this case, vibration is readily transmitted to the yoke 15 in the duty operation, and relatively large noise is caused. On the other hand, in the first embodiment of the present invention, because the movable core 111 always does not contact the fixed core 51, vibration transmitted to the valve plate 71 and the valve seat 25 of the housing 20 can be readily reduced in the thick wall portion of the housing 20, and is difficult to be transmitted to the yoke 41. Accordingly, noise caused in the electromagnetic valve 10 can be greatly reduced.

According to the first embodiment, the movable rod 90 includes the shaft 92 that is connected to the movable core 111 and the valve body 91 and has the radial dimension smaller than that of the valve body 91. In addition, the maximum gap Gmax, that is a separated distance in maximum between the movable core 111 and the fixed core 51, is larger than the dimension L that is the movable stroke of the movable rod 90. Thus, the movable stroke of the movable core 111 is determined by the movable stroke of the movable rod 90, thereby the movable core 111 always does not contact the fixed core 51. As a result, it can restrict the generation of the vibration of the fixed core 51, and the noise generation in the electromagnetic valve 10.

Because the movable core 111 does not contact the fixed core 51, it is unnecessary to set an additional nonmagnetic space for improving the rapid switch of the electromagnetic valve 10 between the movable core 111 and the fixed core 51. Further, the drain port 33 is provided in the housing 20 around the shaft neck portion 92a, and the valve body 91 is disposed to contact the valve seat 25 or to be separated from the seat 25 so that the communication with the drain port 33 is made possible or is shut. Thus, component number can be reduced in the electromagnetic clutch 10, and assembling operation of the electromagnetic clutch 10 can be made simple.

When the electromagnetic valve 10 is used for a duty-ratio valve of a liquid pressure control, because the movable core 111 does not have the unnecessary moving stroke, the high-speed on/off operation of the electromagnetic valve 10 can be readily obtained. Therefore, the dynamic range in the relationship between the duty ratio and the solenoid control pressure becomes wider, and the control of the engagement state of the clutch or the brake can be readily performed.

Because the gap passages 112 through which the receiving chamber 34 communicates with the space 36 are provided on the outer peripheral wall of the movable core 111 so that the operation oil flows through the gap passages 112, the oil pressure of the operation oil supplied to an engagement unit of the automatic gear can be accurately controlled in accordance with the duty ratio of the control current without restricting the reciprocating movement of the movable core 111, and the responsive performance of the electromagnetic valve 10 relative to the switching operation can be improved.

Further, the operation oil flows through the outlet port 32 in the direction substantially perpendicular to the imagination axial line 120 along the attachment direction 120 of the electromagnetic valve 10 into the body member used as the fluid member defining an oil pressure circuit. Thus, even when the pressure of the operation oil in the outlet port 32 is changed due to the duty ratio control, the vibration of the operation oil pressure is applied to the electromagnetic valve 10 in the direction substantially perpendicular to the imagination axial line, but is not applied to a direction opposite to the attachment direction 120 of the electromagnetic valve 10. That is, the vibration of the operation oil pressure is not applied to the direction for removing the electromagnetic valve 10. Accordingly, it can prevent an inclination of the electromagnetic valve 10 attached into the body member, and frictional wear of an attachment member through which the electromagnetic valve 10 is attached to the body member. Thus, it is unnecessary to strengthen the attachment structure of the electromagnetic valve 10 into the body member.

Figure 6:
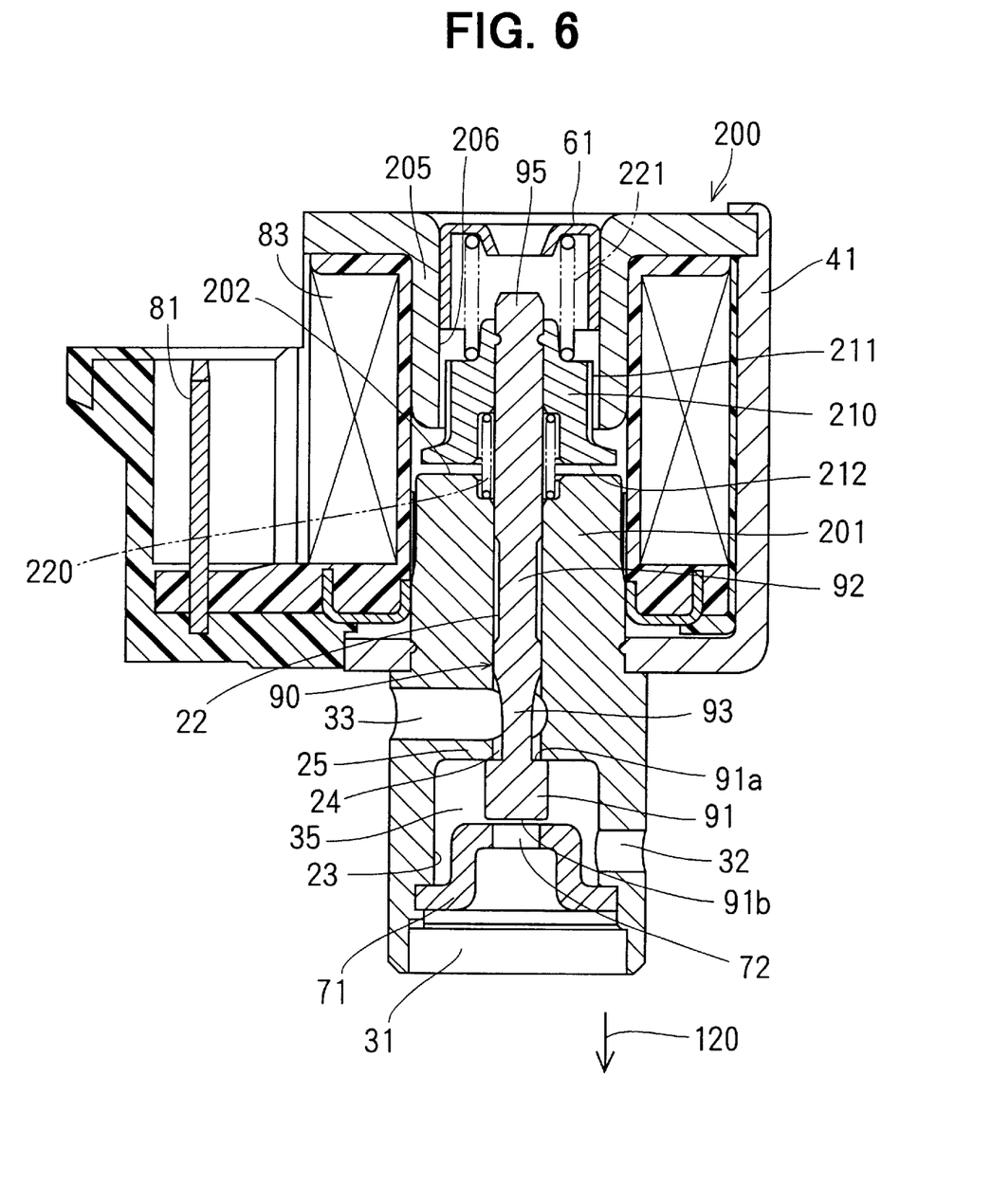
FIG. 6 is a cross-sectional view showing an electromagnetic valve according to a second preferred embodiment of the present invention.
Figure 7:
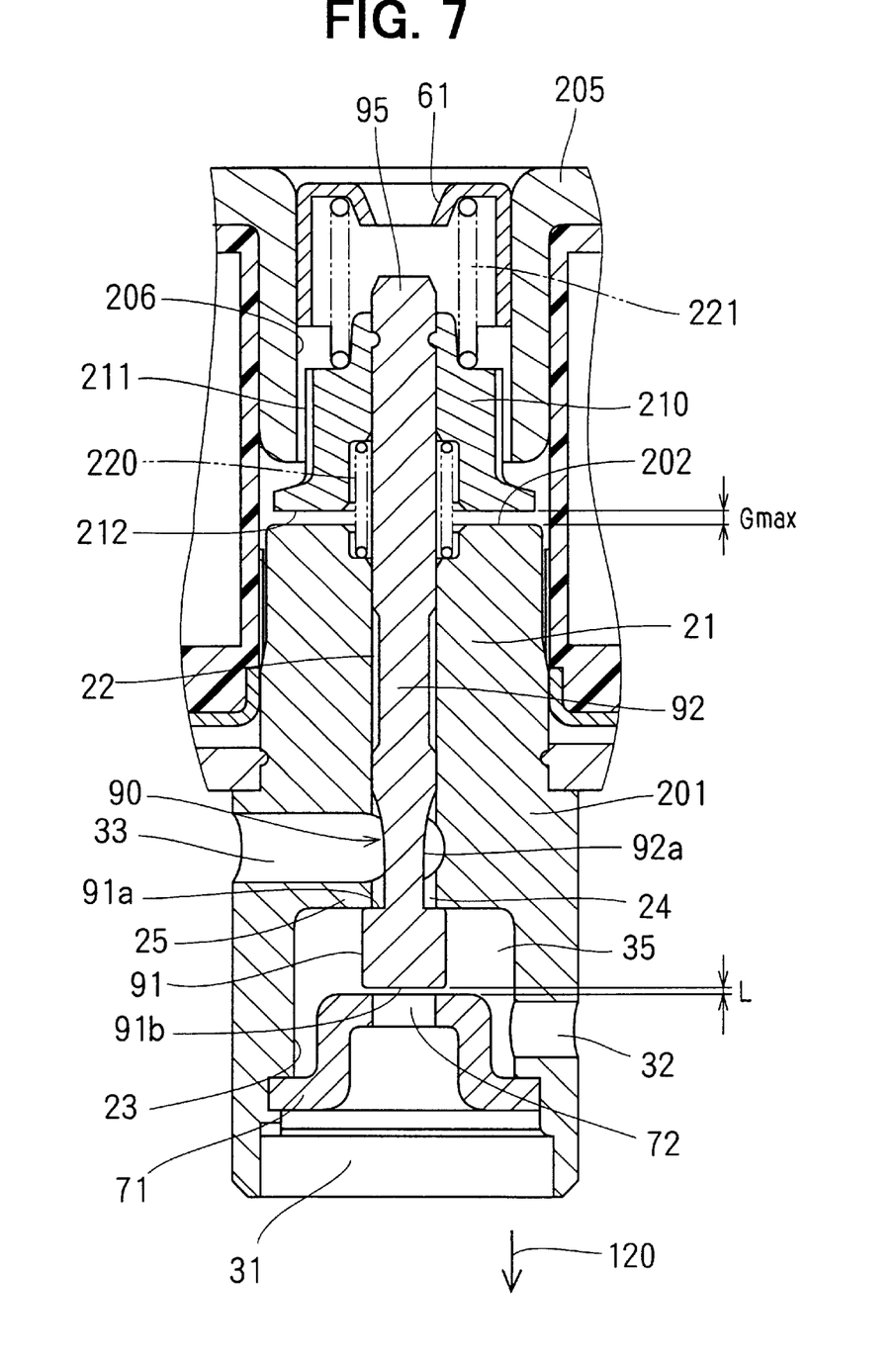
FIG. 7 is an enlarged view showing a main part of the electromagnetic valve in FIG. 6.
Figure 8:
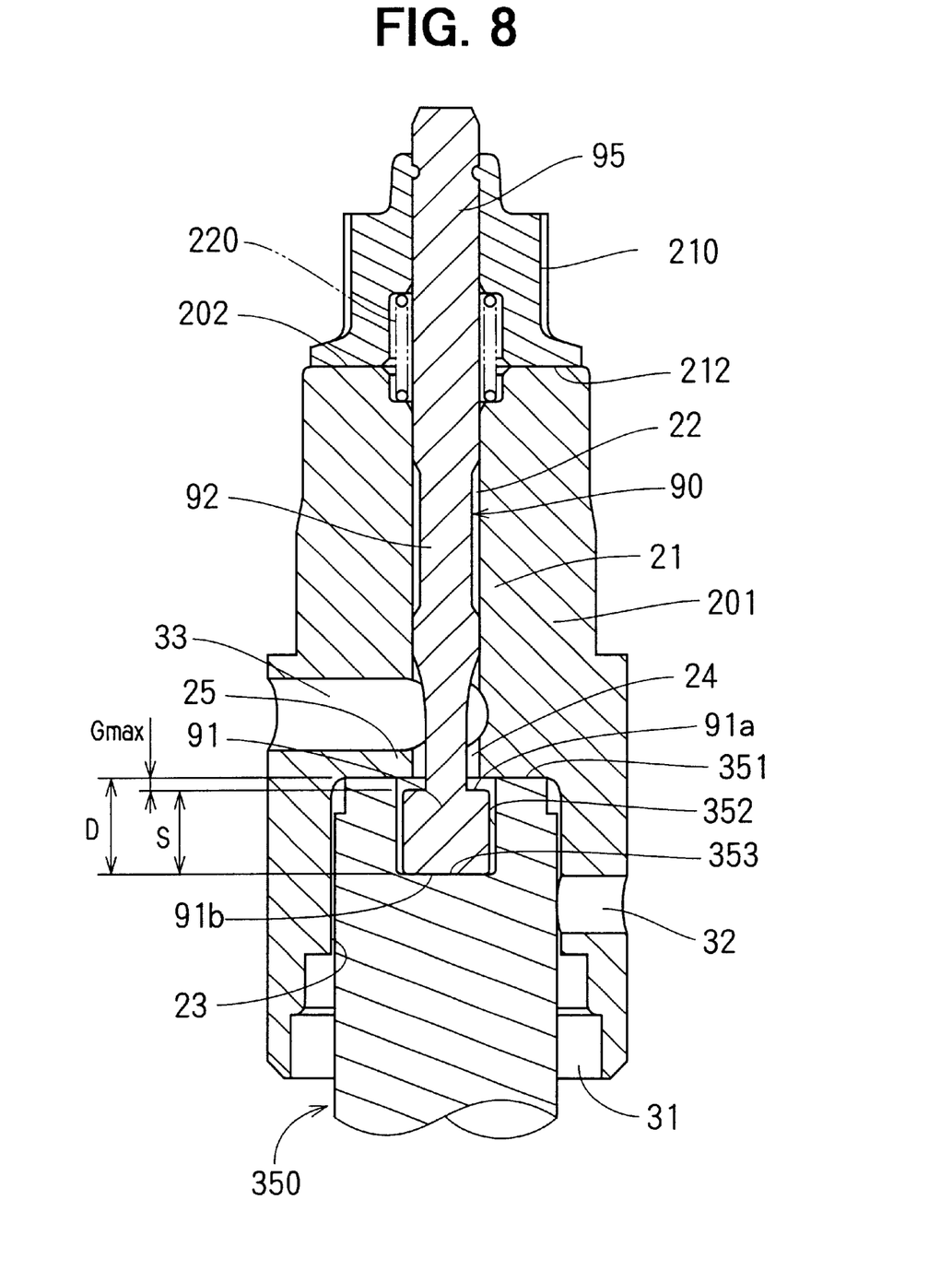
FIG. 8 is a cross-sectional view showing an assembling state of a movable core and a movable rod of the electromagnetic valve, according to the second embodiment.

A second preferred embodiment of the present invention will be now described with reference to FIGS. 6–8. In the above-described first embodiment, the magnetic attraction surface 52 is provided in the fixed core 51. However, in the second embodiment, a magnetic attraction surface 202 is provided in a housing 201 made of a magnetic material such as iron. Therefore, in the second embodiment, the direction for moving a movable core 210, due to the magnetic attraction force, is opposite to that in the first embodiment. Therefore, the biasing direction of a return spring 220, for biasing the movable core 210 in the direction opposite to the magnetic attraction direction, is also different from that of the first embodiment. The other parts in the second embodiment are substantially similar to those of the above-described first embodiment, and are indicated by the same reference numbers.

A cylindrical outer peripheral surface 211 of the movable core 210 is disposed opposite to a cylindrical inner peripheral surface 206 of a fixed core 205 (yoke-side core). The yoke-side core 205 is fixed by fastening the end portion of the yoke 41 that is fixed to the housing 201 by press-fitting or fastening.

A return spring 220 is disposed between the movable core 210 and the housing 201. Further, a spring 221 is disposed between the movable core 210 and the thin cylindrical adjustor 61 to apply spring force for moving the movable core 210 close to the housing 201. Here, the thin cylindrical adjustor 61 is press-fitted into an inner wall of the yoke-side core 205, and the spring force of the spring 221 is adjusted by the adjustor 61 to be smaller than the spring force of the return spring 220.

In the second embodiment, the spring 221 is for adding the spring force for biasing the movable core 210 toward the magnetic attraction surface 202 of the housing 201, and the return spring 220 is for adding the spring force for biasing the movable core 210 in a direction away from the magnetic attraction surface 202 of the housing 201.

When the electrical power supplied to the coil 83 is turned off, because the spring force of the return spring 220 is larger than the spring force of the spring 221, the force for separating the movable core 210 from the housing 201 is applied so that the valve body 91 of the movable rod 90 is separated from the valve seat 26 and seats on the valve seat 25. Therefore, the communication hole 72 is opened so that the inlet port 31 communicates with the outlet port 32. In this case, the communication hole 24 is closed, and the communication between the outlet port 32 and the drain port 33 is shut. Further, the maximum gap Gmax is set between the magnetic attraction surface 212 of the movable core 210 and the magnetic attraction surface 202 of the housing 201.

On the other hand, when the electrical power supplied to the coil 83 is turned on, the magnetic attraction force is generated between the housing 201 and the movable core 210, the movable core 210 moves toward the housing 201 against the spring force of the return spring 220, and the valve body 91 of the movable rod 90 moves to separate from the valve seat 25 and to contact the valve seat 26. Therefore, the communication hole 72 is closed, and the communication between the inlet port 31 and the outlet port 32 are shut. At this time, the communication hole 24 is opened, and the outlet port 32 communicates with the drain port 33. In this case, the gap between the magnetic attraction surface 212 of the movable core 210 and the magnetic attraction surface 202 of the housing 201 is reduced, and becomes a value of (Gmax–L). Even in this case, the magnetic attraction surface 212 of the movable core 210 does not contact the magnetic attraction surface 202 of the housing 201.

When the electrical power supplied to the coil 83 is turned off, the magnetic attraction force disappears, and the movable core 210 moves in a direction away from the housing 201 by the spring force of the return spring 220. Therefore, the valve body 91 of the movable rod 90 is separated from the valve seat 26 and contacts the valve seat 25. Accordingly, the inlet port 31 communicates with the outlet port 32, and the communication between the outlet port 32 and the drain port 33 is shut.

Next, an assembling method for assembling the movable core 210 and the movable rod 90 will be now described with reference to FIG. 8. First, the shaft 92 of the movable rod 90 is inserted into the receiving hole 22 of the housing 201 from the side of the valve seat 25. Next, an assembling jig 350 is inserted into a portion corresponding to the outlet pressure chamber 35 from the side of the inlet port 31. The assembling jig 350 has a seat contact surface 351 provided to contact the valve seat 25. A valve-body receiving chamber 352, into which the valve body 91 of the movable rod 90 is received, is provided in the assembling jig 350 to be recessed from the seat contact surface 351. A bottom surface 353 defining the valve-body receiving chamber 352 is provided to contact the front surface 91b (i.e., lower surface in FIG. 8) of the valve body 91. Here, the depth D of the valve-body receiving chamber 352, that is, a length dimension from the contact surface 351 to the bottom surface 353, is set at an addition value (S+Gmax) adding the maximum gap Gmax to the length dimension S of the valve body 91.

Next, the seat contact surface 351 of the assembling jig 350 contacts the valve seat 25, the return spring 220 and the movable core 210 are fitted to the shaft 92 of the movable rod 90, and the front surface 91b (lower surface) of the valve body 91 of the movable rod 90 contacts the bottom surface 353 of the assembling jig 350 while the movable core 210 contacts the housing 201. In this state, the movable core 210 is fastened to the shaft 92 by the fastening or the like. Finally, the assembling jig 350 is removed.

According to the second embodiment of the present invention, an electromagnetic valve includes the movable rod 90, the movable core 210 fixed to the shaft 92, the housing 201, the valve plate 71 and the return spring 220. The movable rod 90 is constructed by the shaft 92 and the valve body 91 at the axial end of the shaft 92. The movable core 210 is disposed to be fixed to the shaft 92, and has the magnetic attraction surface 212 that can be formed perpendicular to the axial line or can be formed into a conical shape.

The housing 201 with the shaft holding portion 21 has the receiving hole 22 in which the shaft 92 is held to be slidable in the axial direction, the drain port 33 communicating with the receiving hole 22 in a direction substantially perpendicular to the axial line, the drain communication hole 24 communicating with the receiving hole 22 in the axial direction, the valve seat 25 for opening and closing the drain communication hole 24 by using the rear surface 91a of the valve body 91, the recess portion 23 using the valve seat 25 as the bottom wall, the inlet port 31 defined by the top end portion of the recess portion 23, the outlet port 32 provided in the side wall of the recess portion 23, and the magnetic attraction surface 202 opposite to the magnetic attraction surface 212.

The valve plate 71 for defining the output pressure chamber 35 with the recess portion 23 is inserted into and fixed to the recess portion 23 from the inlet port 31, and has the communication hole 72 that is opened and closed by the front surface 91b of the valve body 91. In addition, the return spring 220 is disposed to apply the spring force to the movable core 210 in a direction away from the magnetic attraction surface 202.

When the electrical power supplied to the coil 83 is turned off, the valve body 91 separates from the valve seat 26, and contacts the valve seat 25, so that the communication hole 72 is opened and the communication hole 24 is closed. On the other hand, when the electrical power supplied to the coil 83 is turned on, the valve body 91 moves to be separated from the valve seat 25 and to contact the valve seat 26. Therefore, the communication hole 72 is closed, and the communication port 24 is opened. In the second embodiment, the magnetic attraction surface 212 and the magnetic attraction surface 202 are set to not contact even when the electrical power is supplied to the coil 83.

In addition, according to the assembling method of the shaft 92 and the movable core 210, the assembling jig 350 has the seat contact surface 351 disposed to contact the valve seat 25, and the receiving chamber 352 for receiving the valve body 91 therein is provided in the assembling jig 350 to be recessed from the seat contact surface 351. Further, the receiving chamber 352 is set to have the depth D that is the addition value adding the length dimension S of the valve body 91 and the maximum gap Gmax.

In the assembling method of the second embodiment, the shaft 92 is inserted into the receiving hole 22, the seat contact surface 351 of the assembling jig 350 contacts the valve seat 25, and the return spring 220 and the movable core 210 are fitted to the shaft 92. In addition, the valve body 91 contacts the bottom surface 353 defining the valve-body receiving chamber 352, and the magnetic attraction surface 212 contacts the magnetic attraction surface 202. In this state, the movable core 210 is assembled and is fixed to the shaft 92 by the fastening or the like. Accordingly, in the second embodiment, the movable core 210 can be accurately assembled to the shaft 92 of the movable rod 90 by simple operation.

Although the present invention has been fully described in connection with the preferred embodiments thereof with reference to the accompanying drawings, it is to be noted that various changes and modifications will become apparent to those skilled in the art.

For example, in the above-described embodiments of the present invention, the electromagnetic valve is typically used for a three-way valve controlled by the duty ratio. However, the electromagnetic valve of the present invention can be used for a switching valve (opening/closing valve) without being controlled by the duty ratio. Even in this case, in the switching valve, responsive performance in switching operation can be improved, and flow amount control can be accurately performed.

Such changes and modifications are to be understood as being within the scope of the present invention as defined by the appended claims.

What is claimed is:

1. An electromagnetic valve for an operation member, comprising:
    a fixed core;
    a housing having an inlet port for introducing a fluid, an outlet port for supplying the fluid into the operation member, and a drain port for draining the fluid;
    a movable core disposed in the housing opposite to the fixed core to be reciprocated in the housing;
    a movable member disposed to be reciprocated together with the movable core, the movable member including a valve body for switching a communication between the inlet port and the outlet port and a communication between the outlet port and the drain port, and a shaft connected to the movable core and the valve body; and a coil for generating a magnetic attraction force for moving the movable core toward the fixed core, wherein:

the shaft is disposed to extend in an axial line, and has a radial dimension smaller than that of the valve body;

the inlet port and the outlet port are provided in the housing in such a manner that the fluid flows into the housing from the inlet port in a direction along the axial line and flows out from the outlet port in a direction substantially perpendicular to the axial line;

the fixed core and the movable core are disposed to have a maximum distance therebetween, the maximum distance being larger than a movable stroke of the movable member;

the movable core has a movable stroke that is controlled by the movable stroke of the movable member;

the valve body and the shaft are connected and define an integrated and solid body;

the housing has a first seat portion and a second seat portion opposite to the first seat portion; and the valve body has a top surface for contacting the first seat portion, and a bottom surface for contacting the second seat portion, wherein:

the housing has an inner wall defining a receiving hole for receiving the shaft;

the shaft has a slidable portion slidable on the inner wall of the housing, and a small radial portion connected to the slidable portion and the valve body; and the small radial portion has a radial dimension that is smaller than that of the slidable portion.

2. The electromagnetic valve according to claim 1, wherein the movable stroke of the movable core is set to be smaller than the maximum distance between the fixed core and the movable core.

3. The electromagnetic valve according to claim 1, wherein:

when the top surface of the valve body contacts the first seat portion, the inlet port communicates with the outlet port, and a communication between the outlet port and the drain port is shut; and when the bottom surface of the valve body contacts the second seat portion, a communication between the inlet port and the outlet port is shut, and the outlet port communicates with the drain port.

4. The electromagnetic valve according to claim 1, wherein the movable core has an outer peripheral wall defining a gap passage through which a space for receiving the movable core in the housing communicates with a space provided on an outer periphery of the movable core.

5. The electromagnetic valve according to claim 1, wherein a liquid pressure of the fluid flowing out from the outlet port is controlled by performing a duty-ratio control.

6. The electromagnetic valve according to claim 1, wherein:

the movable core has a magnetic attraction surface;

the fixed core has a magnetic attraction surface opposite to the magnetic attraction surface of the movable core;

when electrical power supplied to the coil is turned off, the magnetic attraction surface of the movable core is separated from the magnetic attraction surface of the fixed core by the maximum distance; and when the electrical power is supplied to the coil, the magnetic attraction surface of the movable core moves toward the magnetic attraction surface of the fixed core until a position separated from the magnetic attraction surface of the fixed core by a distance smaller than the maximum distance.

7. The electromagnetic valve according to claim 6, wherein:

the housing has therein a receiving chamber for receiving the valve body;

the movable core and the movable member are movable in a direction along the axial line;

the valve body is disposed in the receiving chamber to be movable within a height dimension of the receiving chamber in the axial line; and the height dimension of the receiving chamber is set at an addition value adding a length dimension of the valve body and the movable stroke of the movable core in the axial line.

8. The electromagnetic valve according to claim 6, further comprising:

a return spring disposed to apply spring force to the movable core in a direction for moving the movable core away from the magnetic attraction surface of the fixed core.

9. The electromagnetic valve according to claim 1, wherein the drain port is provided in the housing around the small radial portion.

10. The electromagnetic valve according to claim 1, wherein the top surface and the bottom surface of the valve body are substantially parallel to each other.

11. The electromagnetic valve according to claim 1, wherein the valve body has an approximate rectangular shape in cross section.

12. The electromagnetic valve according to claim 1, the top surface of the valve body is generally parallel to a surface of the first seat portion, and the bottom surface of the valve body generally parallel to a surface of the second seat portion.

13. The electromagnetic valve according to claim 1, wherein the bottom surface of the valve body is substantially planar, defined in a plane that is substantially perpendicular to the axial line.

14. The electromagnetic valve according to claim 1, wherein the top surface of the valve body is substantially planar, defined in a plane that is substantially perpendicular to the axial line.

* * * * *